Figure 1:
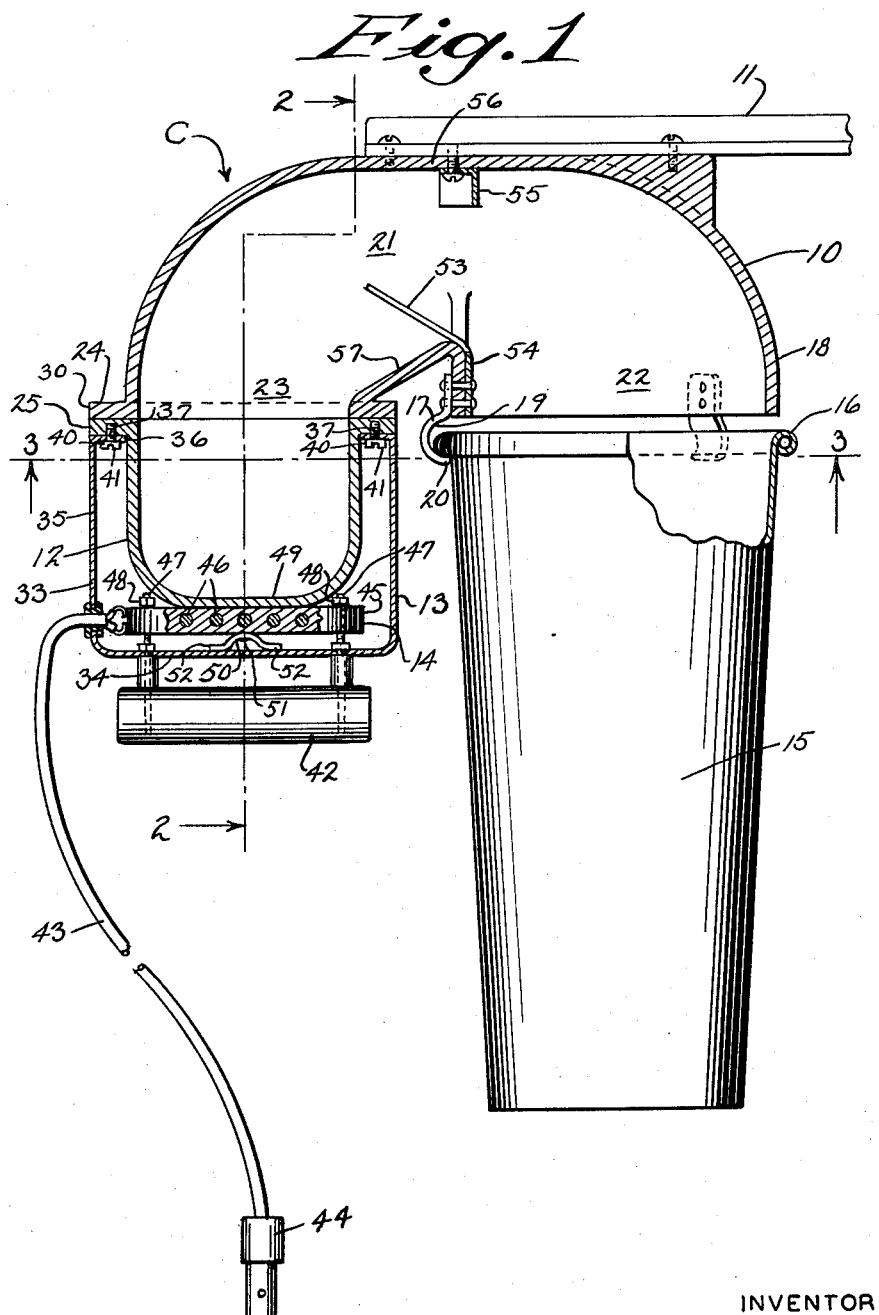

Oct. 23, 1962 A. W. LINDEMANN 3,059,567
PORTABLE CORN POPPER
Filed Sept. 1, 1960 2 Sheets-Sheet 1

INVENTOR
ARTHUR W. LINDEMANN

BY
Wright and Wright
ATTORNEYS

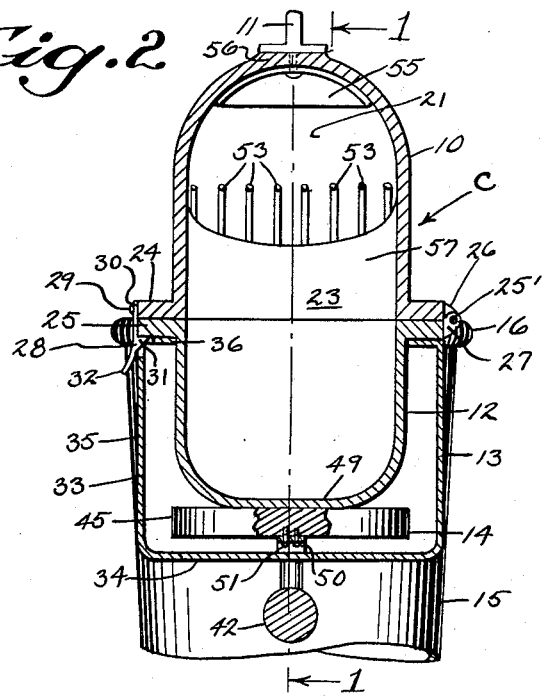
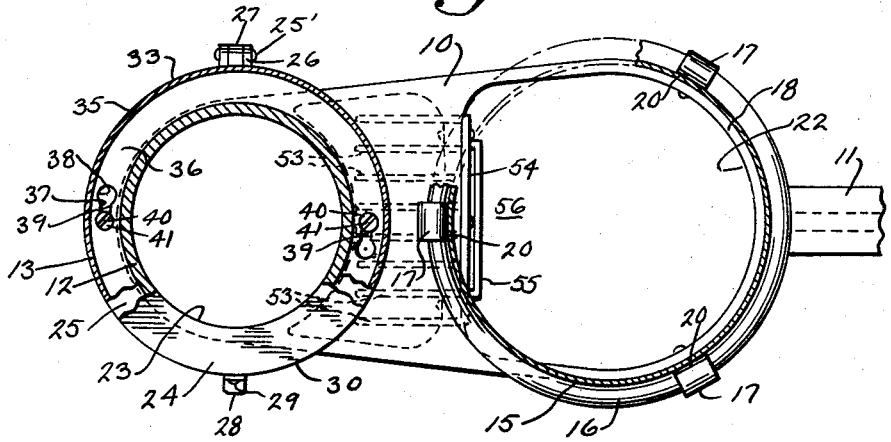

3,059,567
PORTABLE CORN POPPER
Arthur W. Lindemann, 1560 Shawnee Pass,
Brookfield, Wis.
Filed Sept. 1, 1960, Ser. No. 53,397
2 Claims. (Cl. 99—238.6)

This invention appertains to popcorn poppers and more particularly to a portable popper having a disposable container for receiving the popcorn.

In the past, there have been numerous types of popcorn poppers for home use and popcorn could easily be obtained from vending machines, popcorn stands and the like, but no means has been provided for the fresh popping of corn in automobiles, airplanes, trains, boats, trucks and the like and to my knowledge, no popcorn popper has been developed of a portable nature which pops the corn and delivers the same directly to a disposable container and which popcorn is delivered to the disposable container by reason of the inherent kinetic energy delivered as the corn pops.

Therefore, it is a primary object of my present invention to provide a portable popcorn popper that delivers the popped corn through its own inherent kinetic energy into a removable disposable container.

Another important object of my present invention is to provide a popcorn popper which can be readily used in airplanes, trains, boats, automobiles and trucks by utilizing the available current supplied by the vehicle's own electrical system.

A further object of my present invention is to provide a portable popcorn popper having a self-contained heating and popping unit and means for directing the kernels as they pop into a disposable container and which unit is mounted on a bracket adapted to be readily affixed to any convenient support.

A more specific object of my present invention is to provide a cup-like container which is hinged to the popper body and into which the kernels may be placed to be popped and under which I provide a suitable heating element assembly that can be readily removed and replaced with a 115-volt unit or a 6-volt unit, a 12-volt unit or a 28-volt unit as required.

Still another object of my present invention is to provide a portable popcorn popper having a line cord terminating with a cigarette lighter adapter so that the electrical system of various vehicles can be utilized with a certain heating unit to pop the corn.

A further object of my present invention is to provide a portable popcorn popper having means including spaced fingers and an upper baffle plate for directing the popped kernels toward the fingers so that any unpopped kernels are returned to the popping chamber and the popped or puffed kernels will be directed toward the disposable container.

A salient feature of my present invention resides in the fact that my novel popcorn popper can also be readily adapted to vending machines by mounting a number of units on a revolvable wheel and providing means whereby the heating element will be energized upon deposit of the proper coin and wherein the disposable containers will be positioned for ready access to the customer.

A further object of my present invention is to provide a simple, practical and reliable construction that is economical to manufacture, easy to assemble and positive in its operation.

With the above and other objects in view, which will more readily appear as the nature of the invention is better understood, the same consists in the novel construction, combination and arrangement of parts hereinafter more fully described, illustrated and claimed.

One preferred and practical embodiment of my present invention is shown in the accompanying drawings, in which:

FIGURE 1 is a vertical section through my novel unit take on the line 1—1 of FIGURE 2 of the drawings, looking in the direction of the arrows;

FIGURE 2 is a vertical section taken through the forward portion of my novel unit, the section being represented by the line 2—2 of FIGURE 1 of the drawings, looking in the direction of the arrows and illustrating further details in my novel cup used for initiating the popping action; and FIGURE 3 is a horizontal section through my device, the section being represented by the line 3—3 of FIGURE 1 of the drawings, looking in the direction of the arrows, and with certain other parts being broken away to illustrate further details of construction.

Referring now to the drawings in detail wherein similar reference characters designate corresponding parts throughout the several views, the letter C generally indicates my novel popcorn popper and the same includes, broadly, an upper hollow body section 10 to which a supporting bracket 11 or the like is secured, a hinged popcorn cup 12 and a detachable frame 13 carrying the heating element 14. At the other end of my hollow main body portion 10 the disposable container 15 is adapted to be positioned.

This disposable container 15 can be of any standard type but for the purposes of description, the container shown is of the paper type having an upper rolled peripheral rib or flange 16 and this flange 16 is engaged by spring fingers 17 riveted or otherwise secured about the outer periphery of the end 18 of the main body portion 10. Obviously, any number of spring fingers 17 may be utilized but as shown, I prefer to provide three spaced fingers and it should be noted that preferably the inner rounded surface 19 of each finger is considerably larger than the flange 16 so that the container 15 can be raised slightly and tilted to be easily removed. Inasmuch as the disposable container is preferably made of cardboard, paper or the like, it can be easily deformed and therefore a new container can be readily pushed between the fingers and then the ends 20 can engage under the flanges 16 and hold the new container in proper position. The hollow body 10 is substantially U-shaped as is readily and clearly shown in FIGURE 1 of the drawings and provides therefore a U-shaped passageway 21 having a relatively enlarged outlet opening 22 and a somewhat smaller opening 23 at the opposite end thereof. The outlet opening 22, of course, carries the depending spring fingers 17 for holding the disposable container 15.

The inlet opening 23 is provided with a horizontally disposed circular peripheral flange 24 and the popper cup 12 is provided with an upper circular peripheral flange 25 of a size and configuration to be aligned with the flange 24 of the body. Therefore (note FIGURE 2 of the drawings) the cup 12 is hinged as at 25' at one end by providing one leg 26 of the hinge secured to the peripheral flange 24 and the other leg 27 secured to the peripheral flange 25 of the cup. The cup 12 is held in its closed position as shown by providing a simple spring latch 28 riveted or otherwise secured at 29 to the outer periphery 30 of the peripheral flange 24. This latch has a keeper portion 31 which engages under the peripheral flange 25 as shown and of course is also provided with a finger portion 32 so that the latch can be moved from out of engagement with the flange 25 and the cup readily pivoted on its hinge to an open or inoperable position.

A salient feature of this invention resides in my novel removable heating element or unit 13 and it can be seen that the same includes a cup-shaped outer casing 33 providing a bottom wall 34 and the upper circular side wall 35. This casing is provided with an inwardly directed peripheral flange 36 and I provide a pair of slots 37 (note FIGURE 3 of the drawings) and these slots are spaced diametrically opposite one another and are each provided with an enlarged apertured end 38 and a smaller restricted portion 39 and it is to be noted that while these slots are identically formed, in the position opposite one another, the enlarged apertures 37 are also diametrically opposite for a reason that will be apparent as the description proceeds. Now, in order to detachably secure the casing 33 to the cup 12, I provide a pair of metal bolts 40 which are secured to the under-surface of the peripheral flange 25 and are each provided with a head 41 of a size and configuration to be received through the enlarged aperture 38 but which cannot be received through the more restricted opening 39 of the slots 37. To facilitate the easy removal of this casing 33 and also to facilitate the hinging of the cup when the casing is attached thereto, I provide a longitudinally extending handle 42 and this handle is secured in any known manner to the under wall 34 of the casing. Thus, it can be seen that by grasping the handle 42, the casing 33 can be rotated until the enlarged openings 38 are in alignment with the heads 41 of the screws 40. In this position, the casing and heating element can be readily removed from the cup for substituting a heating element of a different voltage or to facilitate the repair of the unit.

When it is desired merely to fill the cup with kernels to be popped, the handle is utilized to manipulate the cup on its hinge. Obviously, the latch finger 32 is grasped and the latch keeper is pivoted from beneath the flange 25.

As previously mentioned, the heating element 14 may be of the type to be utilized with an ordinary house current and wire 43 will be provided with the ordinary house plug instead of the cigarette lighter adapter 44 as shown. The heating element 14 as shown and described in the drawings also may be of a low voltage type adapted to operate on the electrical system of a motor vehicle, boat, airplane or the like. Thus, the heating element can be of any known standard type and merely includes a flat plate 45 carrying the coil or heating elements per se, 46. The plate 45 is held to the bottom wall 34 of the casing by means of the upstanding bolts 47 which pass through suitable apertures formed in the plate and upon which the nuts 48 are adapted to be placed. In order to insure the fact that the plate will be in constant contact with the bottom wall 49 of the cup, I provide a leaf spring 50 which is secured to the plate by any suitable manner but, as illustrated in FIGURE 2, I prefer to utilize a pair of metal screws 51. The ends 52 of this spring are of course free and tend to urge the heating plate 45 into contact with the cup when the unit is assembled as shown.

As is readily apparent to those familiar with the popping of corn, not all of the kernels will pop and explode and therefore I provide the novel means within the hollow body 10 to prevent the unpopped kernels from reaching the container 15. This means includes a number of spring fingers 53 secured at their base 54 to the throat of the open end 22 and the fingers are spaced one from the other, at a distance to allow unpopped kernels to fall through but so as to direct the popped kernels to the disposable container. Thus, the fingers 53 extend angularly from their base 54 upward and toward the open end 23 of the body 10. Further, I provide a baffle 55 secured to the top wall portion 56 of the body 10 and so arranged as to direct the corn as it moves from the cup through the channel or opening 21 downwardly towards the fingers 53. Thus, the unpopped kernels will fall through the fingers and be guided back into the cup due to the slanting wall 57 and the popped kernels will be guided due to the slant of the fingers 53 into the container 15. The bracket 11 may obviously be of any desired shape or form but I have shown the same secured to the upper wall 56 so that the device can be readily slid and secured to a holding bracket (not shown) under the dash of an automobile, for example. This also makes my device highly portable and of the type that can be utilized in almost any place where a source of current is available.

While I have shown and described certain specific embodiments of my invention, it will be understood that these embodiments are merely for the purpose of illustration and description and that various other forms may be devised and that changes may be made in the proportion and minor details of construction without departing from the spirit of my invention or the scope of the appended claims.

I claim:
1. A popcorn popper including a hollow body having a downwardly extending open throat at each end, a popcorn containing cup and heating element unit secured to said body at one throat, a disposable container detachably carried by said body at said other throat opening, a baffle secured in said hollow body intermediate and between said throat openings, a plurality of spaced fingers adjacent to and below said baffle secured to said body and extending angularly from one throat opening upwardly toward said other throat opening, said fingers being so constructed and arranged as to allow whole kernels to fall between the fingers but restricted to guide popped corn toward said disposable container, and means associated with said body for securing said device to a support.

2. A device as set forth in claim 1 wherein a series of spring fingers are secured to the outer periphery of the body at one throat entrance for receiving the upper open end of the disposable container.

References Cited in the file of this patent
UNITED STATES PATENTS

| | | |
|---|---|---|
| 1,512,323 | Wallace | Oct. 21, 1924 |
| 2,097,681 | Wolcott | Nov. 2, 1937 |
| 2,541,218 | Doerr | Feb. 13, 1951 |
| 2,922,355 | Green | Jan. 29, 1960 |